United States Patent [19]

Hou

[11] Patent Number: 5,358,822
[45] Date of Patent: Oct. 25, 1994

[54] METHOD OF MAKING A LIQUID TONER FOR ELECTROPHOTOGRAPHIC IMAGING

[75] Inventor: Wei-Hsin Hou, Whitehall, Pa.

[73] Assignee: Coulter Corporation, Miami, Fla.

[21] Appl. No.: 135,195

[22] Filed: Oct. 12, 1993

Related U.S. Application Data

[62] Division of Ser. No. 645,174, Jan. 24, 1991, Pat. No. 5,270,445.

[51] Int. Cl.$^5$ ............... G03G 9/08; G03G 9/10; C08F 6/00
[52] U.S. Cl. ............... 430/137; 430/111; 521/56; 521/61; 526/201; 528/486; 528/499; 528/502
[58] Field of Search ............... 430/111, 137; 521/56, 521/61; 526/201; 528/486, 499, 502

[56] References Cited

U.S. PATENT DOCUMENTS

| | | | |
|---|---|---|---|
| 3,674,719 | 7/1972 | Jenkins | 521/61 |
| 4,702,840 | 10/1987 | Degen et al. | 521/27 |
| 4,904,562 | 2/1990 | Yusa et al. | 428/138 |

*Primary Examiner*—John Kight, III
*Assistant Examiner*—Shelley A. Dodson
*Attorney, Agent, or Firm*—Sidney N. Fox

[57] ABSTRACT

A method of making liquid toner for electrophotographic imaging by forming a mixture of a polyamide polymer, a good solvent therefor and a particulate pigment, heating the polymer/pigment/solvent mixture to form a solution thereof, cooling the resulting solution to precipitate fine polymer-encapsulated pigment particles of generally uniform size and morphology, removing the precipitated particles, removing the solvent and redispersing the resulting particles in dispersant medium along with a charge-control agent to form the liquid toner. A steric stabilizer can be added to the polymer-encapsulated pigment particle dispersion.

14 Claims, 20 Drawing Sheets

FIG. 5
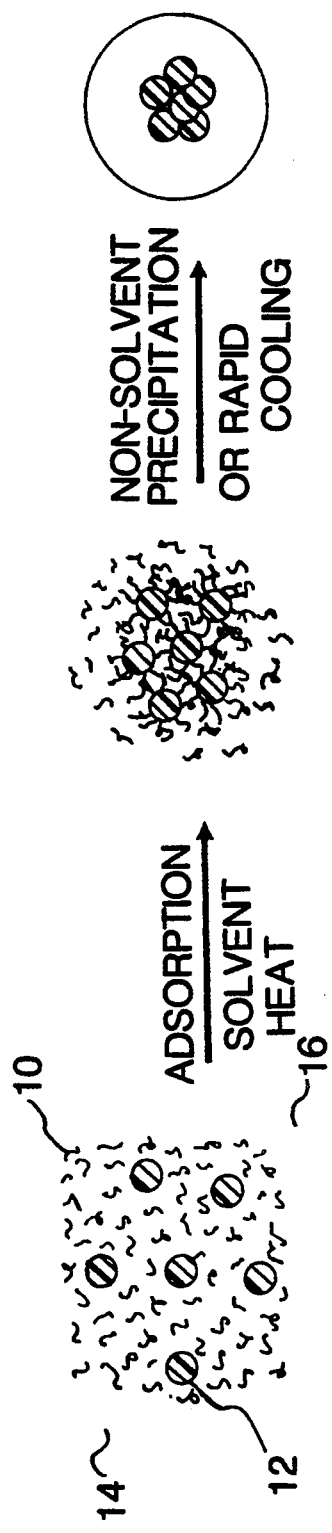
I. GN/MO/EtOH
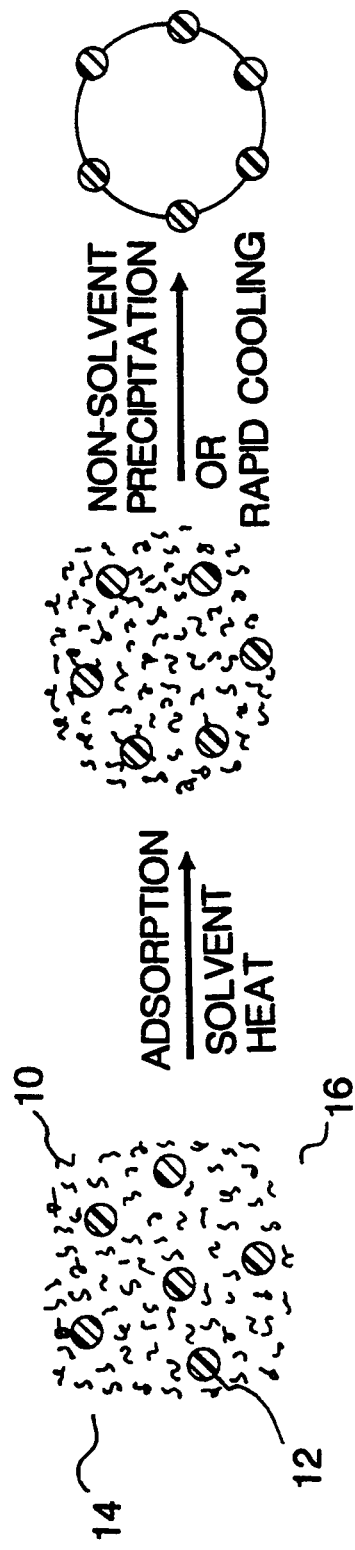
II. GN/RL/EtOH

⊘ :PIGMENT
○ :POLYMER

|  | pigment of particle (wt%) | pigment on surface (wt%) | blackness density |
|---|---|---|---|
| GN | 0.0 | x | 0.00 |
| GR-1 | 1.0 | x | 0.37 |
| GR-2 | 4.8 | 4.8 | 0.81 |
| GR-3 | 9.1 | 7.9 | 1.16 |
| GR-4 | 16.7 | 10.3 | 1.44 |
| GR-5 | 33.3 | 25.0 | 1.71 |
| RL | 100 | x | 1.65 |
| GN | 0.0 | x | 0.00 |
| GM-1 | 1.0 | x | 0.24 |
| GM-2 | 4.8 | 1.2 | 0.60 |
| GM-3 | 9.1 | 2.1 | 0.76 |
| MO | 100 | x | 1.87 |

FIG. 6

|  | pigment content (wt%) | particle size by SEM (nm) | surface area by BET ($m^2/g$) | pigment on surface (wt%) |
|---|---|---|---|---|
| RL | × | × | 71.7 | × |
| MO | × | × | 211.4 | × |
| GN | × | 2000 | 40.7 | × |
| GR-1 | 1.0 | 1200 | 17.3 | × |
| GR-2 | 4.8 | 800 | 28.4 | 4.8 |
| GR-3 | 9.1 | 700 | 32.5 | 7.9 |
| GR-4 | 16.7 | 600 | 36.3 | 10.3 |
| GR-5 | 33.3 | 500 | 47.4 | 25.0 |
| GM-1 | 1.0 | 1200 | 17.4 | × |
| GM-2 | 4.8 | 800 | 27.1 | 1.2 |
| GM-3 | 9.1 | 700 | 28.1 | 2.1 |

FIG. 7

|  | *RL* | *MO* |
|---|---|---|
| Zeta potential in Cu Naphthenate 0.005 wt% of Isopar G | +45 mV | +15 mV |
| Zeta potential in chloroform | +90 mV | +30 mV |
| Surface Characteristics | more basic | less basic |
| Stability of pigment 0.1wt% in EtOH at 25°C | stable over one month | flocculated in 10 min. |
| Stability of pigment 0.1wt% in EtOH at 60°C | stable over one week | flocculated in 10 min. |
| Acid-Base interaction Between pigment and EtOH | stronger $AB_{12}$ | weaker $AB_{1'2}$ |
| Amount of GN polymer adsorbed on the pigment in EtOH containing GN 1wt% and pigment 0.5wt% at 60°C | 19 % | 26 % |
| Acid-Base interaction between pigment and GN | weaker $AB_{13}$ | stronger $AB_{1'3}$ |

FIG. 8

|  | BaPB | | Cu NAPHTHENATE | |
| --- | --- | --- | --- | --- |
|  | 0.005wt% | 0.1wt% | 0.005wt% | 0.1wt% |
| RL | -143 | -68 | +45 | +75 |
| MO | -150 | -90 | +15 | +23 |
| GN | -150 | -83 | +60 | +98 |
| GR-1 | x | x | x | x |
| GR-2 | -113 | -75 | +38 | +75 |
| GR-3 | -113 | -75 | +38 | +75 |
| GR-4 | x | x | x | x |
| GR-5 | -113 | -75 | +38 | +75 |
| GM-1 | x | x | x | x |
| GM-2 | -128 | -75 | +53 | +83 |
| GM-3 | -113 | -83 | +45 | +75 |

- RL and MO are prepared as 0.025 wt% of the medium

- GN, GR series and GM series particles are prepared as 0.05 wt% of the medium.

- All of the measurements are carried out after 12 hour tumbling at room temperature.

FIG. 9

METHOD OF MAKING A LIQUID TONER FOR ELECTROPHOTOGRAPHIC IMAGING

This application is a division of Ser. No. 07/645/174 filed Jan. 24, 1991 U.S. Pat. No. 5,270,445.

FIELD OF THE INVENTION

This invention relates generally to techniques for forming fine polymer particles and polymer-encapsulated particulates, including polymer-encapsulated pigment particles particularly for use in liquid toner dispersions for electrophotographic imaging and more particularly, the invention provides a precipitation method resulting in the formation of polymer particles, including mono-dispersed particles as well as polymer-encapsulated particulates, including polymer-encapsulated pigment particles, said polymer particles and said encapsulated particulates having improved physical properties and controllable surface characteristics making the encapsulated pigment particles especially useful when dispersed in an electrical insulating dispersion medium, as liquid toner for electrophotographic imaging.

BACKGROUND OF THE INVENTION

Polymer particles have achieved wide use for many purposes including pharmaceutical applications, catalytic applications, carriers for encapsulated materials such as magnetic materials, ceramic carriers for electronic applications, as standards and calibration means for particle study systems, controls for administration of mediciments, filler for chromatographic columns and as research tools for the study of various physical phenomina.

Pigment particles dispersed in an electrical insulating medium have been widely established as important alternatives to dry toners for electrophotography. Often the pigment particles have been adherently bound to the surface of polymer particles and dispersed in a dispersant medium. Problems of poor pigment adherence, flocculation, poor dispersal characteristics, lack of size and morphology uniformity, colloidal instability as well as difficulty in transfering the toner to and bonding same on the image carrier medium.

Accordingly, efforts have been made to provide polymer particle carriers for pigments and polymer-encapsulated pigment particles for the purpose of eliminating or at least reducing the above mentioned difficulties encountered with the above mentioned liquid toners. Liquid toners generally include a dispersion medium, a polymer binder, a steric stabilizer, the pigment and a charge control agent. The dispersion medium commonly employed is an aliphatic isoparafin hydrocarbon such as sold under the trademark ISOPAR by Exxon Corporation. This dispersion medium is electrically insulating, has a resistivity greater than $10^{-14}$ ohm-centimeters, a low freezing temperature, a viscosity of approximately 1.5 cSt at room temperature, a low melting temperature and good electrochemical stability. Steric stabilizers are employed to aid in the dispersal of the particles in the dispersion medium, to stabilize the particle against flocculation and to fix the toner to the paper forming a satisfactory polymer film. Block and graft copolymers have been preferred for steric stabilizers.

The type of pigment particles employed were either organic or inorganic materials, depending upon the color of the image required. The pigment should be embedded within the toner particle or so strongly attached to the surface thereof so that the pigment particle does not become separated from the polymer. Such separation may cause a background image and/or may compromise the photoactivity of the colorant by absorbing incident light during illumination. Another important criterion for the liquid toner is its ability to undergo electrophoresis. This requires use of a charge control agent which controls the magnitude and polarity of the surface charge and thus determines the mobility and electrostatic force of the particle. The proper charge control agent also minimizes the presence of free counter-ions that contribute to the conductivity of the dispersion medium and discharge the electrostatic latent image being developed, i.e. toned.

Key qualities sought for liquid toner particles include control of particle size, distribution and morphology; uniformity of particle size; colloidal stability; reduction in the incidence of impurities; and good encapsulation of the pigment particles within the polymer binder. Also advantage would be gained if the produced particles would be provided in dry form with the retention of uniformity in size and morphology desired, as well as the production of non-pigmented particles as well as the pigment-encapsulated particles with like resultant physical characteristics capable of other, versatile applications. Of considerable importance is achieving control of the surface characteristics of the particles, such as surface roughness and surface area.

Traditional methods to form polymeric particles particularly for dispersal in insulating liquid media for use as liquid toners include emulsion polymerization and dispersion polymerization. These methods as practiced heretofore generally require complex recipes involving selected monomers, emulsifiers, dispersants, initiators, inhibitors, etc. It would be advantageous to simplify the recipes and procedures. Known dispersion polymerization methods provide particles which have very smooth surfaces reducing the number of available charge sites on such surfaces. The importance of providing for control of the surface characteristics of the particles such as increased surface roughness and increased surface area is underscored by increase in the number of sites for charge adherence, improved charge distribution and retention by the particle, better adhesion for adherent components and, in the case of toners, adhesion (bonding) to the surfaces carrying the toner image.

Emulsion polymerization processes have results similar to the dispersion polymerization processes. Another conventional method is to precipitate a polymer from a monomer solution, resulting in sponge formation, said sponge requiring a milling or grinding process to reduce the sponge mass to a useful particle size. The resulting ground sponge results in non-uniform size and morphology. Typical processes involving grinding and/or milling steps to reduce the particles size include U.S. Pat. Nos. 4,842,974, 4,820,605, 4,794,651, 4,758,494, 4,631,244, 4,594,305, 4,526,852, 4,525,446 and 4,306,009.

U.S. Pat. No. 4,306,009 involves the use of a thermoplastic monomer dissolved in a non-polar liquid under temperature conditions required to plasticize and liquify the resin and then cooling the resultant solution with stirring to precipitate particles which still require ball-milling. Non-uniform size distribution results. In addition, the particles are formed with plural fibrous extensions which cause the particles to mat during the toning process, a characteristic resulting in a deposition which require careful control of toning conditions in order to control the thickness of the resulting image as well as resulting in limitation of the type of pigments capable of use therewith. With the production of particles having fibrils or the like, separation of the particles and subsequent drying to provide a dry powder toner which can be dispersed in the selected insulating liquid was not provided, the product being the particles dispersed in the liquid dispersion medium rather than dry powder which can be more easily shipped and stored.

Another method for providing toner particles having a pigment component is taught by U.S. Pat. No. 4,595,646, and provides coating of the pigment particles with a resin component, the pigment having first been treated with a humic acid salt and a humic acid derivative and the resultant particle then being coated with the resin component. The particles are dried and are pulverized to reduce their size. The result often is non-uniform size and morphology, as well as the lack of control of such physical characteristics. The '646 patent employs an aqueous solution of the pigment and the humic acid component to which an organic solvent solution of the resin component is added. Water is removed from the surface of the pigment/humic acid component particles to cover the surface of the said particles with the resin component. Water is removed from the resulting composition and then solvent is removed to result in the dry resin coated pigment particles, the latter being thereafter pulverized. Precipitation of polymer-encapsulated pigment particles is not taught.

Polymerization processes generally have involved copolymerization of two or more monomer components which have required complex procedures and conditions. U.S. Pat. No. 4,081,391 is representative. Again difficulties in controlling the physical characteristics of the resulting particles as to size distribution, surface characteristics and uniformity of size and morphology have been encountered.

U.S. Pat. No. 4,415,645 provides a core of a soft fixing material such as a low molecular weight olefin resin or wax with a hard resin layer containing a pigment surrounding said core. The core particle component is formed by spraying. Uniformity of size, morphology and particle physical characteristics as yet have not been achieved.

In U.S. Pat. Nos. 4,842,975, 4,480,865, 4,618,557 and 4,614,699 dispersion polymerization is employed wherein a first monomer is polymerized to form an insoluble polymer and a second monomer is absorbed onto the surface of the said insoluble polymer and the resultant pair is copolymerized.

Accordingly, there has been a long felt need for a method of preparing finely divided polymer particles, including polymer-encapsulated pigment particles, of smaller and more uniform size that those made by conventional, prior, traditional techniques. Further, it would be of advantage to provide a method forming both polymer particles and polymer-encapsulated particulates, including polymer-encapsulated pigment particles which is simplified over the traditional technique, which is easy to perform, which results in better control of particle size and morphology, which results in less contamination, which is versatile, which enables control of the surface properties, such as surface roughness, surface modifications and surface area of the particles, which can be employed to encapsulate different materials such as pigments, metals, magnetic particles for application to discs or tape, which is capable of encapsulating ceramic materials for electronic applications and which is capable of employment in providing ceramic materials for electronic applications and/or encapsulated animal or plant cells for pharmaceutical applications and which can result in the provision of the toner as a dry powder so that shipping and/or storage costs can be reduced over the liquid dispersed compositions.

A need also has arisen for a method for forming polymer particles wherein such method is sufficiently versatile to enable the preparation of polymer particles of controlled surface area, size and morphology, said particles being free of encapsulated components.

Additionally, a significant need has arisen for the provision of a relatively inexpensive and simplified method for producing mono-dispersed particles for many applications including functioning as standards, as calibration of particle study systems, use as chromatographic column media and as controls for administration of mediciments where such method also would capable of being performed with increased speed over presently available methods.

SUMMARY OF THE INVENTION

A method of forming polymer particles, including those having particulates of various types encapsulated within said polymer, which method comprises the steps of forming a solution of a polymer in suitable organic solvent therefor and including the component, if one is to be encapsulated within the polymer, such as a pigment or other particulate material, heating the solution during formation, subsequently, cooling the solution, preferably at a high cooling rate or, alternatively, adding to said solution and mixing therewith a component which is a miscible non-solvent to said polymer under the same or less temperature condition, either of the above being carried out to effect the precipitation of the dissolved polymer as a particulate polymer or precipitated as a polymer-encapsulated particulate, c.a. polymer-encapsulated pigment particles of substantially uniform size, controlled surface characteristics and morphology. The precipitated particles can be washed with the non-solvent to remove any residual organic solvent and a selected charge control agent added to the particulates/non-solvent mixture to form a liquid toner for electrophotographic imaging use. Alternatively, the precipitated polymer-encapsulated particles can be dried, as by evaporation of the non-solvent and/or non-solvent/solvent mixture, and/or vacuum drying to form a dry powder. The dry polymer-encapsulated pigment particles as a dry powder can be redispersed with a low dielectric constant dispersant medium and a charge control agent to form a liquid toner for electrophotographic imaging. A steric stabilizer composition can be utilized during the redispersion. The precipitation method of the invention can be utilized to produce mono-dispersed particles.

BRIEF DESCRIPTION OF THE DRAWINGS

FIG. 5 is a diagrammatic representation illustrating a proposed mechanism of the encapsulation of pigments by polymer chains during the liquid toner preparation employing the precipitation method of the invention;

FIG. 6 is a table illustrating blackness density of different carbon black pigmented polymer particles made by the precipitation method according to the invention as measured by the Macbeth RD 514P densitometer;

FIG. 7 is a table illustrating the surface properties of different pigmented polymer particles which are made by the precipitation method according to the invention;

FIG. 8 is a table illustrating observed properties of two types of pigments encapsulated by the Griltex Nylon polymer, RL being a carbon black pigment Regal L330 and MO being a carbon black pigment MONARCH 1000, GN being Griltex Nylon;

FIG. 9 is a table of the zeta potential of different toner particles made by the precipitation method of the invention which is measured by the Coulter DELSA instrument at different charge control agent concentrations in Isopar G solution at 25 degrees Celsius;

DESCRIPTION OF PREFERRED EMBODIMENTS

Figure 1:
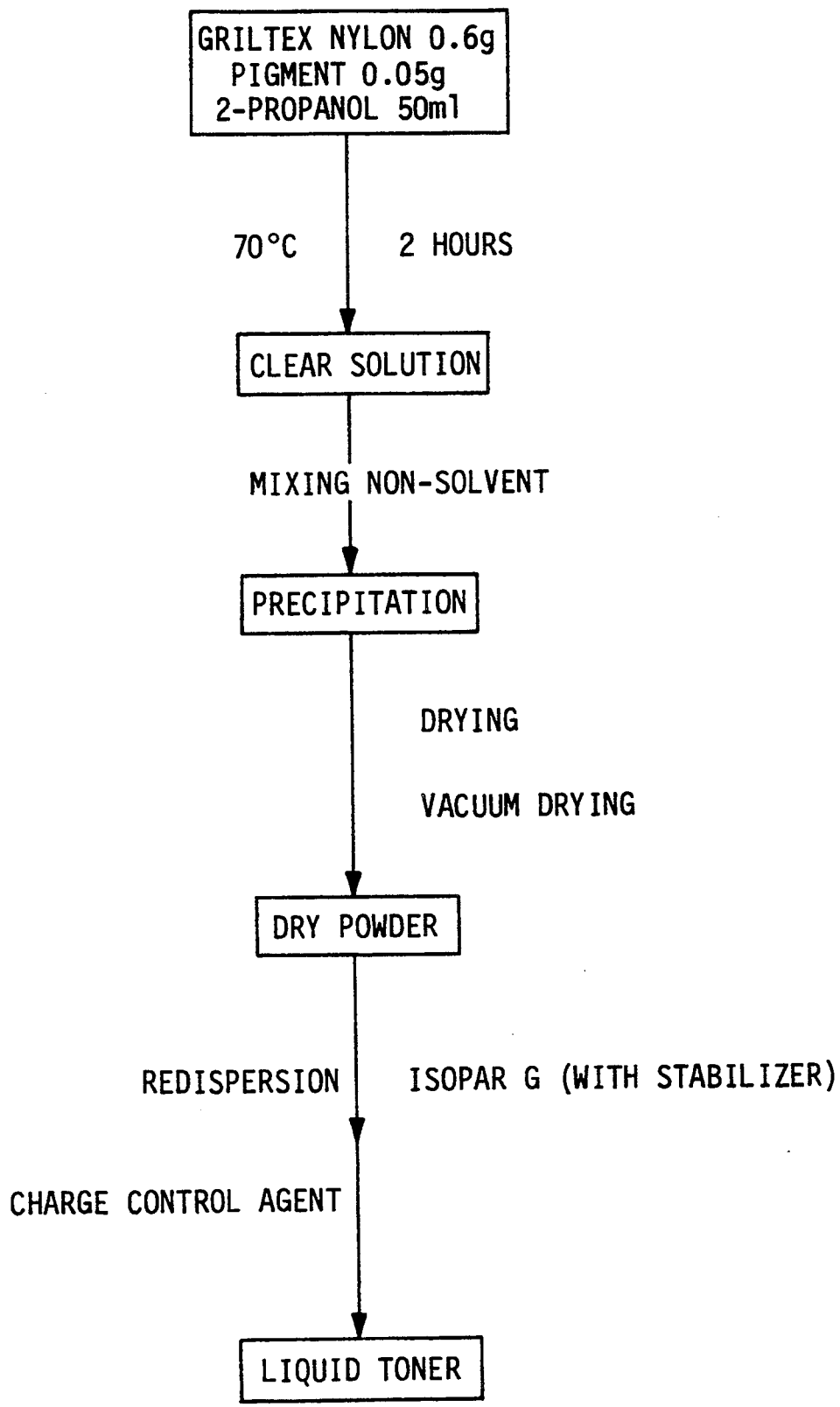
FIG. 1 is a flow diagram illustrating the method of forming a liquid toner by the precipitation method according to the invention.

The invention herein comprises a method for forming polymer particles of controlled size, surface characteristics and morphology by precipitating same from solution of a polymer in a good solvent for said polymer, said solution optionally which may include particulate material such as, e.g. pigment particles, magnetic particles or ceramic particles, intended to be encapsulated by the polymerized polymer. The method includes mixing the polymer and solvent, for example by sonification; heating the mixture to bring the polymer and solvent components into solution; alternatively cooling the resultant solution, preferably at a high rate of cooling, or introducing a non-solvent for said polymer to the resulting solution, the non-solvent preferably being an aliphatic isoparaffin hydrocarbon which is a poor solvent for the polymer at the prevailing temperature condition, or even water, thereby permitting the polymer to precipitate from the solution as either polymer particles per se if no particulate material, such as pigment, is present or as polymer-encapsulated pigment particles where pigment was present; removing the solvent and, either separating the thus formed particles, drying same to form a dry powder, or washing the precipitated particles free of the solvent. Where the particles are polymer-encapsulated pigment particles, after removing the solvent, a suitable non-solvent can be added as well as a charge control agent to form a liquid toner dispersion suitable for electrophotographic imaging applications. Alternatively, the dry particles may be redispersed in the non-solvent along with a stabilizer and a charge control agent to form a liquid toner dispersion also suitable for electrophotographic imaging applications. Where only the polymer particles, i.e. without encapsulated particulates, are formed, the resulting particles may comprise those characterized as mono-dispersed particles arrived at over a time period substantially reduced over conventional method of producing such type of mono-dispersed particles.

Liquid toners generally consist of a dispersion medium, a polymer binder, a steric stabilizer, a pigment and a charge control agent. Generally, the dispersion medium is an electrically insulating material, which has a resistivity greater than $10^{14}$ ohm-centimeters, a viscosity of approximately 1.5 cSt at room temperature, a low freezing temperature and good electrochemical stability. The dispersion medium should be inexpensive, non-toxic and odorless. Materials that are usually selected as dispersion media include an aliphatic parafinnic hydrocarbon sold under the Trademark ISOPAR by EXXON CORPORATION, a similar hydrocarbon sold under the Trademark SOTROL by Philips Petroleum, a similar hydrocarbon sold under the Trademark SOHIO by Standard Oil of Ohio, a similar hydrocarbon sold under the Trademark SHELL SOL by Shell Oil Co. and a similar hydrocarbon sold under the Trademark PEGASOL by Mobil Oil Company.

Steric stabilizers are employed to help disperse the dry pigment in the dispersion medium, to stabilize the particle against flocculation and to fix the toner particle to the paper forming a good polymer film. Ideally, steric stabilizers are amiphipathic in nature. Block and graft polymers are preferred in this art for use as steric stabilizers.

The type of pigment used can be either organic or inorganic material, depending upon the color image required. The pigment must be embedded within the particle or attached strongly to the particle surface to avoid separation of the pigment from the particle which would give rise to background images and which could absorb incident light during illumination, compromising the photoactivity of the colorant. Pigments which have been polymer-encapsulated in accordance with the method of the invention and examples of which are the subject of the photomicrographs among the drawings and the examples described hereinafter include carbon black (REGAL-L 330, MONARCH-1000 and Mogul L), copper phthalocyanine and Perylene Maroon. The listing herein can be supplemented by many available pigments not listed and hence, the invention is not to be considered as limited to those pigments by way of example herein.

A charge control agent is introduced to create surface charge so that the liquid toner can undergo electrophoresis in an electric field. Such agent should maximize the surface charge which will increase mobility and electrostatic repulsive force of the particles. It is also desired that the charge control agent minimize the free ions that can contribute to the conductivity of the dispersion medium and discharge the latent image.

In the liquid toner made in accordance with the method of the invention as embodied in the herein disclosure as examples, the dispersion medium employed is ISOPAR G, its characteristics being as follows:

| Boiling range | 429–449 deg. K. |
| --- | --- |
| Flash Point | 314 deg. K. |
| Dielectric constant(298K) | 2.003 |
| Spec.Conductivity | $3 \times 10^{-15}$ (ohms-cm)$^{-1}$ |
| Density | $0.74 \times 10$ kg · m |
| Viscosity | 1.5 cSt (at room temperature) |
| Refractive Index | 1.4186 |

The polymer employed in the embodiments of the invention disclosed herein is Griltex Nylon (Nylon-6/Nylon-6-6/Nylon-12 copolyamide) having a molecular weight of about 50,000 produced by EMSER INDUSTRIES.

The structure of the monomers respectively is

| Nylon-6 | —NH—(CH$_2$)$_5$—CO— |
| --- | --- |
| Nylon-6-6 | —NH—(CH$_2$)$_5$—NH—CO—(CH$_2$)$_4$—CO— |
| Nylon-12 | —NH—(CH$_2$)$_{11}$—CO— |

Polymer particles were also precipitated from polymer solutions of formed respectively from Nylon 6, Nylon 6,6 and Nylon 6,10 respective polymers dissolved in formic acid as the good solvent therefor and distilled water as the non-solvent, as will be described hereinafter.

Nylon 6,10 is polymerized from the monomer having the structure

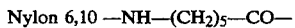
Nylon 6,10 —NH—(CH$_2$)$_5$—CO—

The steric stabilizer suitable for employment in the embodiments of the invention disclosed herein is a graft copolymer of methyl methacrylate/methacrylic acid with pendent oil soluble poly(12-hydroxy stearic acid) chains, known colloquially as "Super Soap" manufactured by Coulter Systems Corporation, and FOA-2, a lauryl/myristylacrylate copolymer manufactured and sold by Dow Chemical Co. The molecular structures are—"Super Soap"

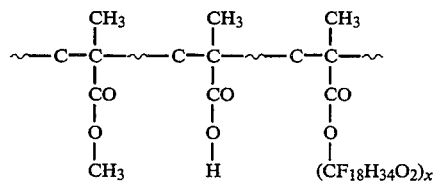

FOA-2

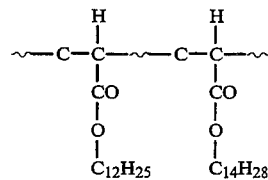

The charge control agents suitable to be employed in the embodiments of the invention disclosed herein are Cupric Naphthenate, Zirconium Octoate, Basic Barium Pertronate and Basic Polyisobutene Succinamide.

The aliphatic alcohols employed in the embodiments of the invention disclosed herein as Examples 1–6 are methanol, ethanol and 2-propanol.

EXAMPLE 1

0.6 grams Griltex Nylon (polymer) and 0.05 grams of pigment in 50 ml of 2-propanol are mixed and heated at 70 degrees Celsius for two hours. The resulting 2-propanol solution is cooled to 40 degrees Celsius and sonified (exposed to sonic waves) for 30 seconds. The resulting solution is poured into a watch glass containing 100 ml. of ISOPAR G without any surfactant and at room temperature. The polymer is precipitated and falls to be bottom of the watch glass; same being placed under a hood overnight to evaporate the supernatant. The precipitate may be dried further in a vacuum oven at room temperature and under 45 mm Hg pressure overnight, leaving a powder-like dry particles. This dry material is redispersed in ISOPR G containing a surfactant (stabilizer) and a charge control agent to form a liquid toner composition. Reference is made to FIG. 1 for a flow-sheet representation of the preparation described in Example 1.

Particle size of the liquid toners prepared by the method of the invention were determined by scanning electron microscopy (SEM). These sizes range from 700 nm to 1200 nm for each pigment group. The dynamic light scattering instrument sold by Coulter Electronics, Inc. as the Coulter N4 was employed also to measure particle size of the toners. Each toner was diluted with ISOPAR G solution containing Super Soap, FOA-2 and different amounts of charge control agent.

Figure 2:
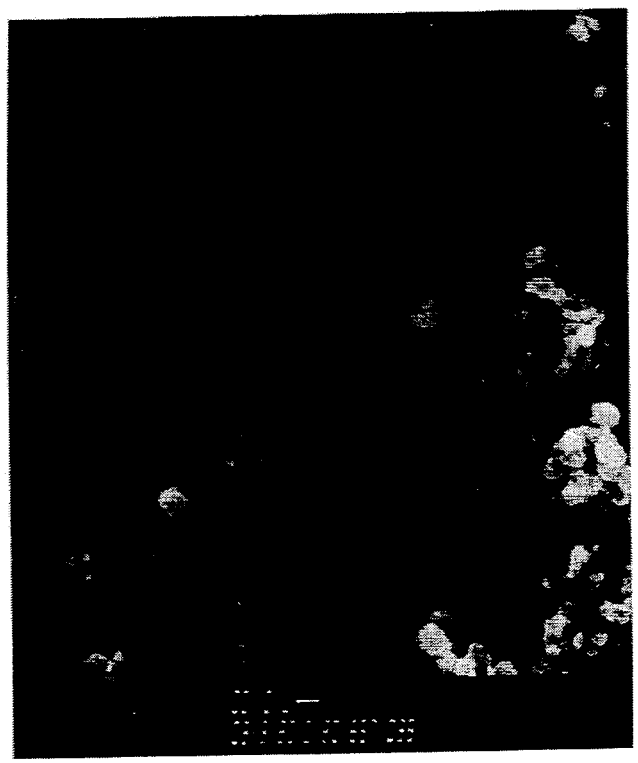
FIG. 2 is a photomicrograph utilizing a scanning electron microscope showing polymer-encapsulated pigment particles of a liquid toner formed by the precipitation method of the invention, utilizing Griltex Nylon as the polymer and copper phthalocyanine (blue pigment) as the pigment.
Figure 2A:
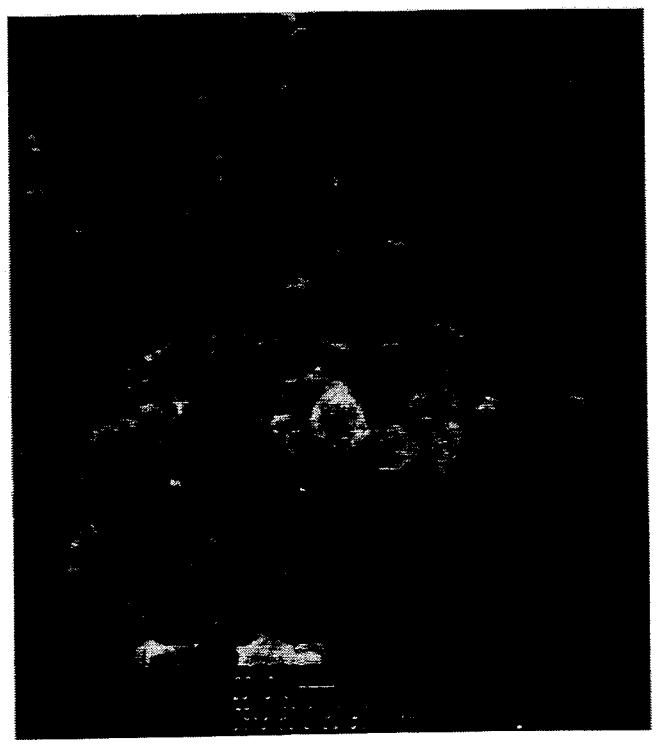
FIGS. 2A and 2B being photomicrographs illustrating the same polymer and the encapsulated pigment being carbon black Mogul L pigment, and the same polymer and the encapsulated pigment being Perylene Maroon (red pigment)
Figure 3:
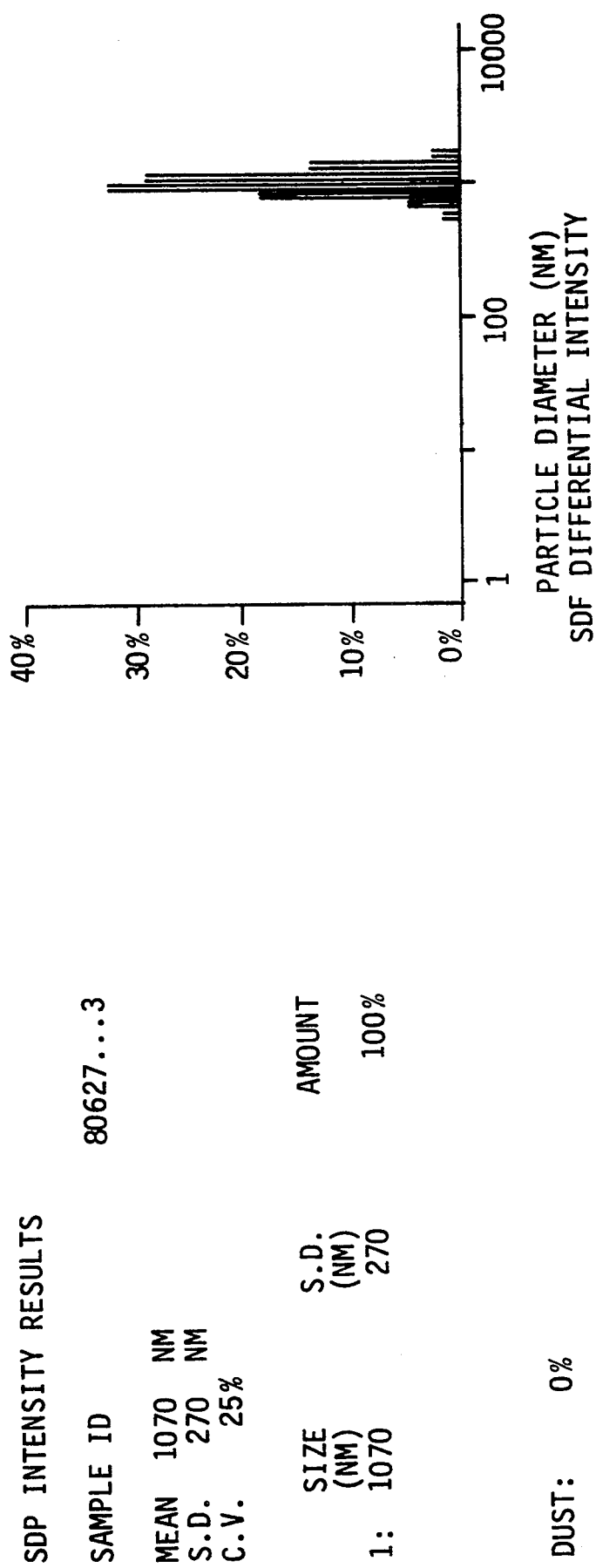
FIG. 3 is a graphical representation of dynamic light scattering data of unpigmented polymer particles formed by the precipitation method according to the invention.

The particle sizes of liquid toner of Example 1 were found to be much smaller and more uniform than those made by other methods. The scanning electron microscopic results are shown in the photomicrographics of FIGS. 2 and 7. In addition, the Coulter N4 results are illustrated in FIG. 3. In FIG. 3, the unpigmented toner particles gave the same results as measured by scanning electron microscopy. In the case of the toner particles made by the precipitation method of the invention, the pigments appeared to be bonded more strongly to the polymer encapsulant. This is believed to indicate that the pigment particles are surrounded and/or absorbed by soluble polymer chains in a good solvent. When the good solvent is changed to a poor solvent, these polymer chains precipitate around the pigments to entrap the pigment particles. Thus the pigment particles are well encapsulated inside the polymer particles and do not appear to disassociate from the polymer particles even during sonification.

The colloidal stability of the toner of Example 1 was monitored by measuring the particle size over a period of time with the Coulter N4. Each sample was sonified for ten minutes before measuring. Colloid stability was also indicated by observations of particle flocculation over a period of time after being allowed gravitationally to settle. According to observations of particle flocculation over a period of time, it appeared that the toner of Example 1 remained suspended in the dispersion medium for more than one day. Other toner made by prior method flocculated and precipitated in less than a couple hours. Thus, the toner of Example 1 appeared to possess good colloidal stability.

According to light scattering measurements, the particle size of unpigmented toner made by the described precipitation method remained fairly constant over several hours indicating a small particle size.

EXAMPLE 2

Figure 3A:
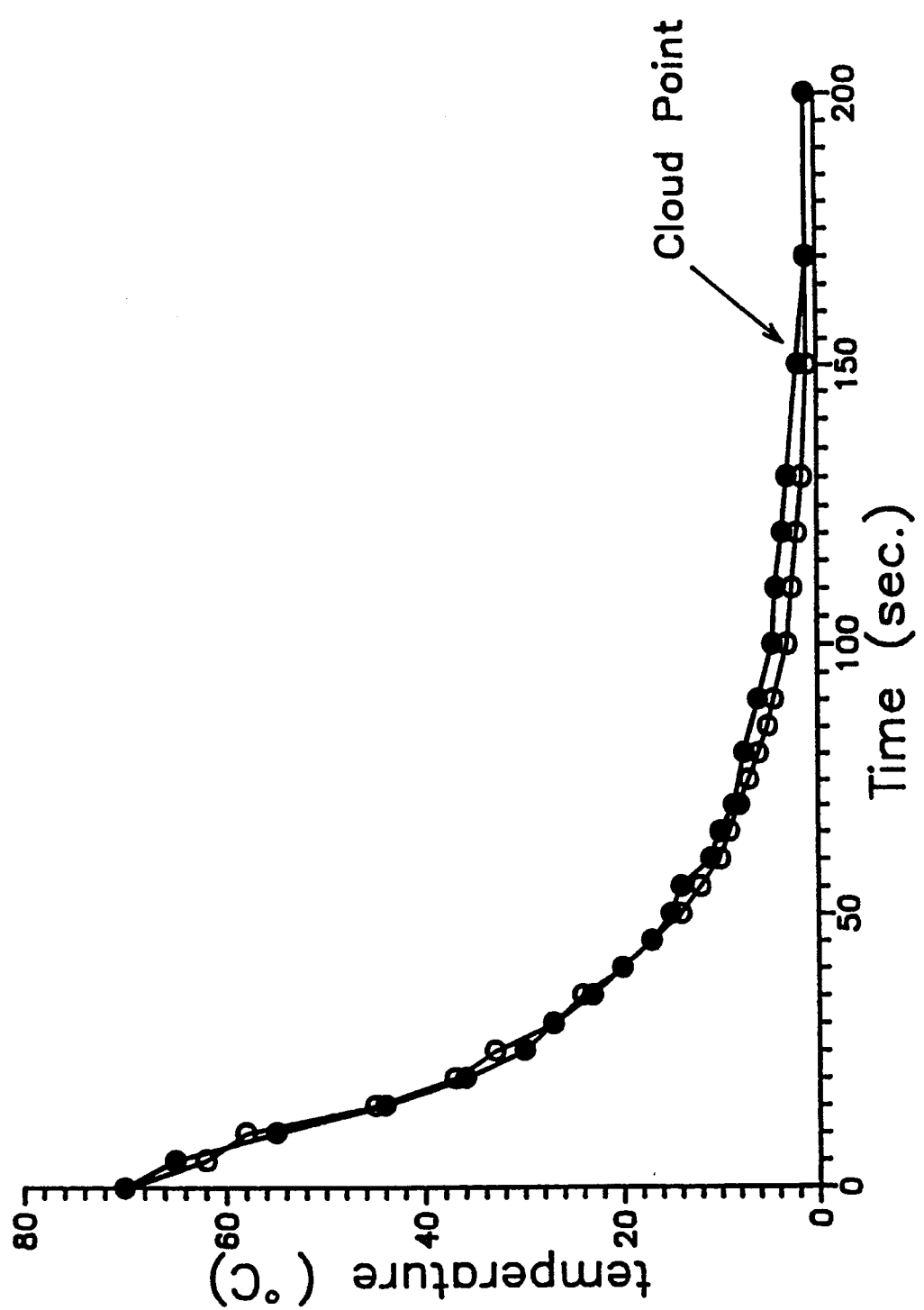
FIG. 3A is a diagrammatic graphical representation illustrating the cooling rate employed to achieve the precipitation of the polymer particles in accordance with the method of the invention.
Figure 4:
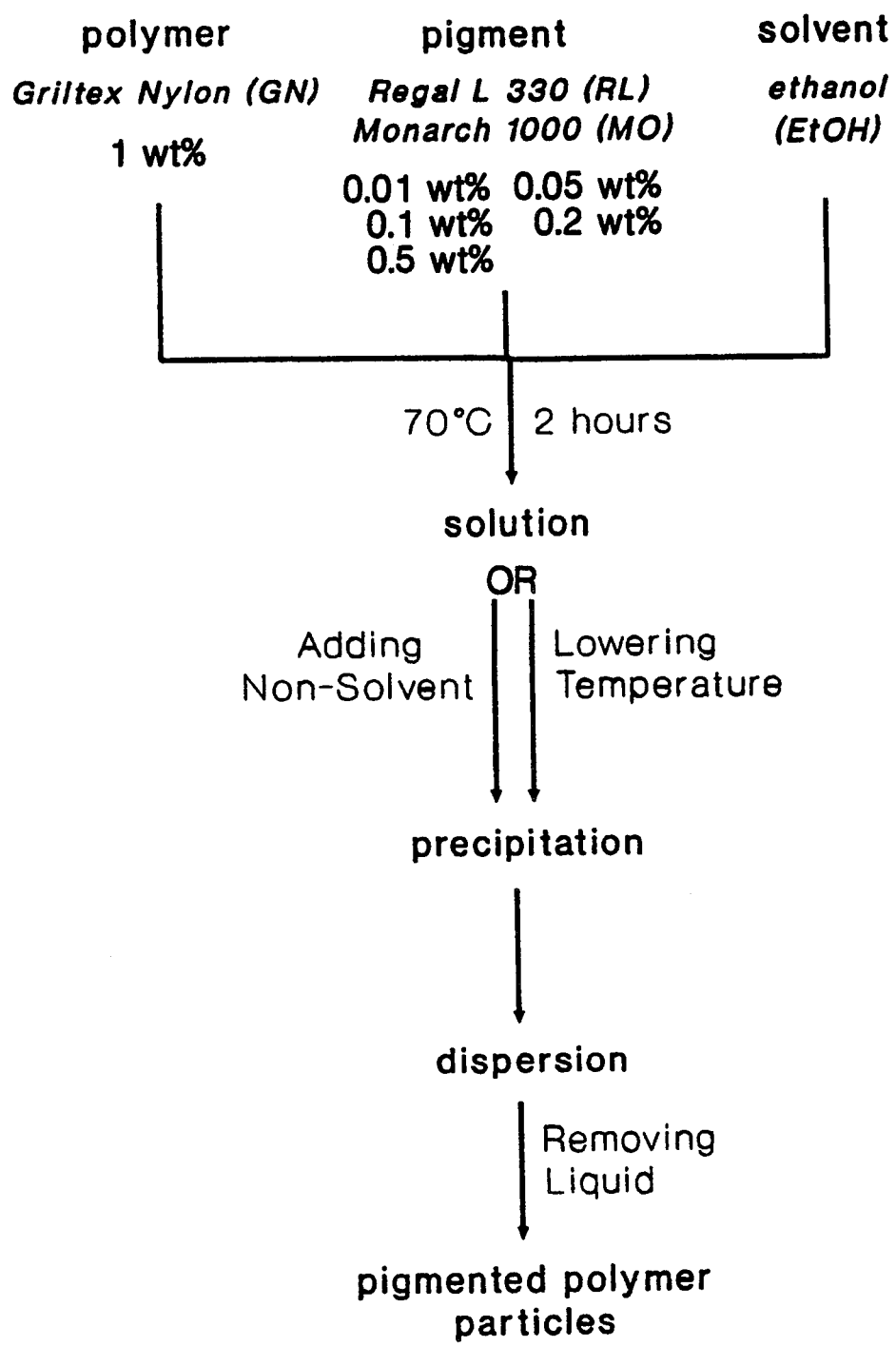
FIG. 4 is another flow diagram illustrating the method of forming polymer-encapsulated toner particles by a modified method of the invention.

1.0 per cent (by weight of solvent) of Griltex Nylon, 0.01 per cent (by weight of the solvent) of REGAL L carbon black pigment were added to ethanol (solvent) and sonified to mix Same at 70 deg. Centigrade and form a solution thereof. The temperature was lowered to about 0 deg. Celsius by placing the resulting solution in flowing ice-water bath. The cooling rate is shown in the graphical representation of FIG. 3A. Ethanol was found to be a good solvent for the polymer at the higher temperature and a poor solvent for the polymer at the lower temperature. The polymer-encapsulated pigment particles precipitated from the solution. The particles were recovered and the ethanol removed by placing the wet particles in a hood under ventilation overnight. Reference is made to FIG. 4 for a flow-sheet representation of the preparation described in Example 2. The dry polymer-encapsulated pigment particles as a powder were redispersed in ISOPAR G and a charge control agent, Cupric Naphthenate, (from 0.001 to 0.1 weight per cent based on the medium), added to form a liquid toner. The steric stabilizer, "Super Soap" also was added (from 0.001 to 0.1 weight per cent based on the medium). Five formulations were prepared using the pigment REGAL L carbon black, differing one from the others in the per cent of pigment. These formulations are designated GR-1, GR-2, GR-3, GR-4 and GR-5 in the FIGS. and tables of the drawings. Non-pigmented Griltex Nylon polymer particles were precipitated from ethanol solution under the same conditions as set forth above and are designated GN in the drawings. In the drawings, RL represents the REGAL L pigment. The weight per cent of the pigment based upon the medium in the designated formulations were 0.01% (GR-1), 0.05% (GR-2), 0.1% (GR-3), 0.2% (GR-4) and 0.5% (GR-5). The above process was followed in the absence of the pigment Griltex Nylon (GN) having been precipitated from ethanol solution to provide the non-pigmented particles.

EXAMPLE 3

A set of liquid toner compositions (three in the set) were prepared following the method, percentage of components and the polymer, solvent and non-solvent components set forth in the description of Example 2 except that the pigment utilized, at the same weight percentages based on the medium as set forth in Example 2, was MONARCH-1000 carbon black. These compositions are represented by GM-1 (0.01%), GM-2 (0.05%) and GM-3 (0.1%) in the FIGS. and tables of the drawings.

EXAMPLES 4 AND 5

Two sets of liquid toner compositions were prepared following the methods, percentage of components and the polymer, pigments, solvents and non-solvents of Examples 2 and 3 respectively but changing the charge control agent from Cupric Naphthenate to Basic Barium Petronate (BaPB). The compositions utilizing BaPB as the charge control agent employed BaPB in the weight percentages based on the medium, namely, 0.001 wt %, 0.005% wt %, 0.01 wt %, 0.05 wt % and 0.1 wt % respectively. The zeta potential of the different toner particles has been measured using the Coulter DELSA instrument at the respective weight percentages of BaPB concentrations relative ISOPAR G and are set forth in FIG. 9 of the drawings.

EXAMPLE 6

A liquid toner was formed utilizing the method, the percentage of components, the polymer, pigment and solvent (ethanol) as set forth as Example 2 except the precipitated polymer-encapsulated particles were not dried. Instead, the precipitated particles were washed with ISOPAR G (two or three times) to remove the ethanol. After the ethanol was removed by washing, the charge control agent was added to result in the liquid toner. The toner particles of Example 6 were more uniform in size and morphology than the other examples. The stability in ISOPAR G improved with either charge control agent. The size and morphology of the Example 6 particles were the same as that of Examples 2 and 3. However, the length of time required to obtain the particles was reduced from about one day for Example 2 particles to three to four hours for the particles of Example 6.

EXAMPLE 7

0.1 gram of Nylon 6 was dissolved in 10 ml. of formic acid (a good solvent for the polymer) at 60 deg. Celsius for one hour. Distilled water (a non-solvent for the polymer) was added to the resulting solution at room temperature until a cloud point was reached. The cloudy solution was heated to 60 deg. Celsius to form a clear solution again. The clear solution then was cooled at a high cooling rate (1 deg. Celsius per second) by placing a container holding the solution in a flowing ice-water bath to precipitate the polymer as spherical particles. The precipitated polymer particles were washed with methanol to remove the forming acid and distilled water. The washed polymer particles were dried in a hood under ventilation over night to form dry powder. The size and morphology of the resulting polymer particles made by this process were found to be very uniform as shown in FIGS. 17A, 17B, 17C and 17D. The particle size was found to be about 10 um. and the particles were found to have a maximum deviation in particle size of at most 1.01 per cent so the particles can be classified as mono-dispersed particles. The particles also were found to have a very high surface roughness.

Examples 8 and 9 were made by the same method as disclosed in Example 7 except that the polymers employed were Nylon 6,6 and Nylon 6,10 respectively, photomicrographs of the resulting polymer particles comprising FIGS. 19A and 19B, and 20A and 20B respectively.

Examples 10 and 11 were made by the same method as disclosed in Example 7 except that the non-solvent employed was methanol and acetone, respectively.

Example 12 was made by the same method as Example 7 except that the polymer employed was polystyrene, the solvent was cyclohexane and the non-solvent was Isopar-G.

It should be noted that the same procedure can be applied to almost any type of polymer, if a suitable solvent and non-solvent can be found.

Referring to FIG. 5, the polymer chains are represented by reference character 10, the pigment particles are represented by reference character 12 and the polymer solvent is prepresented by reference character 14. The solution prepared when the above components are mixed with the aliphatic alcohol solvent (ethanol, methanol, 2-propanol, for example, is represented by reference character 16. After heating for two hours at about 70 degrees Celsius, the polymer chains and the pigment particles are dispersed in the solution 16. The temperature is reduced quickly to 0 degrees Celsius and the non-solvent for the polymer, ISOPAR G, is added. Now the polymer chains precipitate onto the pigment surface and encapsulate the pigment particles as represented by reference character 20. With respect to the interactions between the pigment, polymer and solvent, the adsorption of the polymer chains onto the surface of the REGAL-L pigment particles is minimal so that the pigment particles are located embedded in the polymer, but at the outer surface portion of the toner particle. With the Monarch 1000 carbon black pigment, the pigment particle is entirely within the polymer particle, bunched in the center portion thereof spaced from the outer spherical surface thereof. Therefore, the surface properties of the encapsulated particles can be controlled by changing the interaction between pigment, solvent and polymer depending upon the functional groups of the pigment, the thermodynamic quality of the solvent and the chemical nature of the polymer.

It is believed that the particle size of the toner particles can be controlled by the amount of pigment employed in the polymer/pigment/polymer solvent solution. It has been found that the particle size is decreased with increase in the pigment content.

The precipitated particles have been found to have roughened outer surfaces which may enhance surface adhesion properties. In contrast, particles made by emulsion or dispersion methods generally have smooth surfaces. This property enhances the use of such particles, i.e. precipitated polymer particles in particular, for adhesive coatings and pharmaceutical applications.

In addition, polymer encapsulation of fine particulate materials other than pigments for different applications by the disclosed precipitation method disclosed herein is believed to be feasible. Polymeric seeds can be encapsulated to make core-shell composite latex or multi-layer polymer composites. Metals or magnetic particles also can be polymer encapsulated using the disclosed precipitation technique herein disclosed, as well as ceramic materials, animal cells or plant cells. Since only the polymer and solvent need be present in solution, contamination by dispersants, emulsifiers, initiators, inhibitors or the like can be avoided. The controllable surface properties and the morphology of the resulting polymer-encapsulated particles are of considerable advantage and have not as yet been achieved using conventional or traditional methods of preparation.

It has been found that the introduction and control of amount of the charge control agents can enhance the stability of the polymer-encapsulated pigment particles formed with the disclosed precipitation method. Use of Basic Barium Petronate and Basic Polyisobutene Succinamide as the charge control agent will result in creation of a negatively charged toner particle while use of Cupric Naphthenate and Zirconium Octoate will result in creation of a positively charged toner particle.

The scanning electron microscope, specifically the ETEC AUTOSCAN SCANNING ELECTRON MICROSCOPE has been utilized for observing the surface morphologies and sizes of the precipitated polymer particles and the precipitated polymer-encapsulated pigment particles. The Monosorb Surface Area Analyzer was used to measure the surface area of the precipitated particles by measuring the quantity of nitrogen absorbed on a solid surface at $-195$ degrees Celsius by sensing the thermal conductivity of a flowing mixture of nitrogen and an inert carrier gas. The theoretical basis upon which the Monosorb operates is the BET equation well known to the art.

Figure 5A:
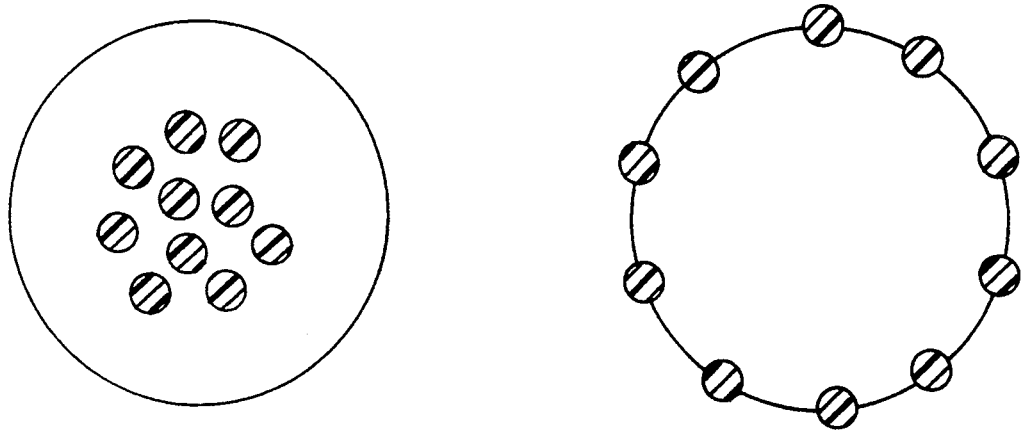
FIG. 5A is a diagrammatic representation illustrating the location of the encapsulated particulate material, here pigment, resulting from the precipitation method of the invention as represented in FIG. 5.
Figure 10:
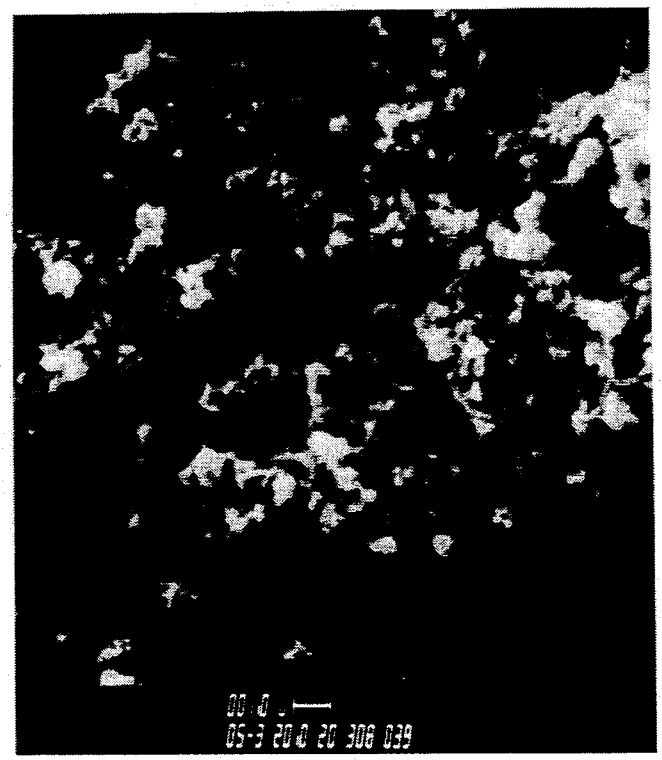
FIGS. 10 to 15 are photomicrographs of the polymer particles and the polymer-encapsulated pigment particles formed according to the method of the invention, GN being the Griltex Nylon polymer, GR representing the Regal L330 carbon black pigment encapsulated by Griltex Nylon polymer and GM representing the Monarch 1000 carbon black pigment encapsulated by Griltex Nylon polymer.
Figure 11:
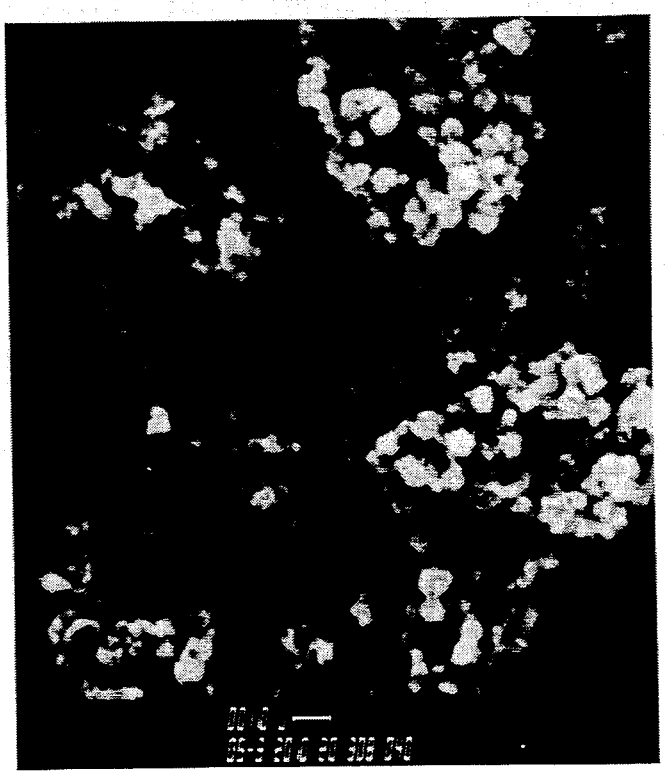
Figure 12:
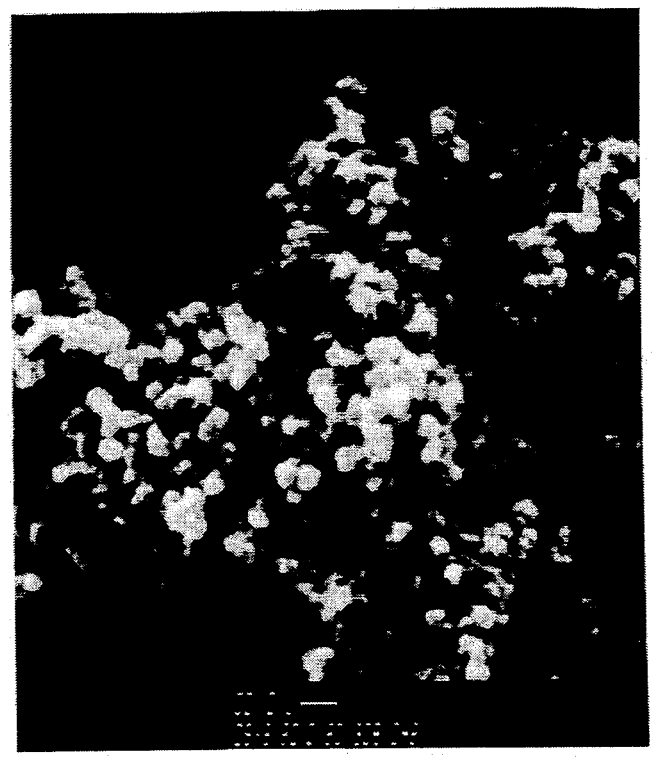
Figure 13:
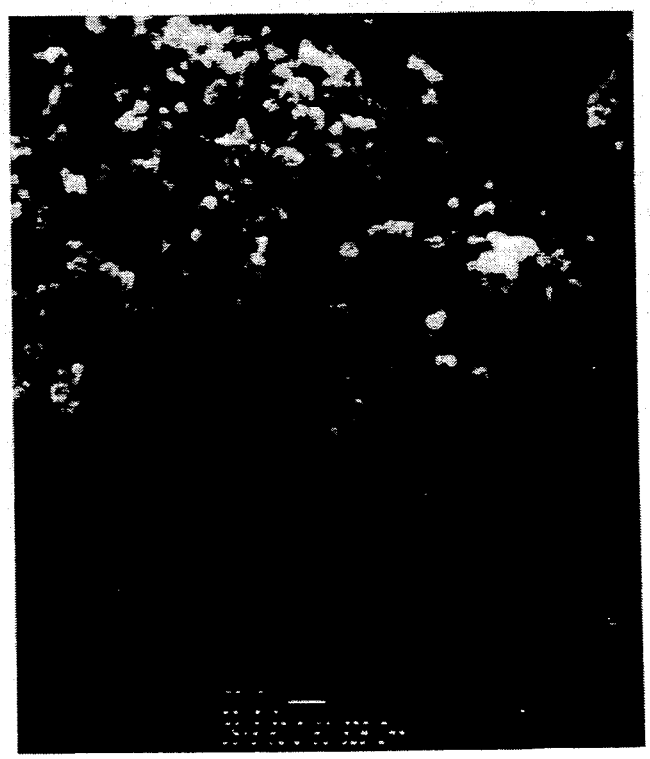
Figure 14:
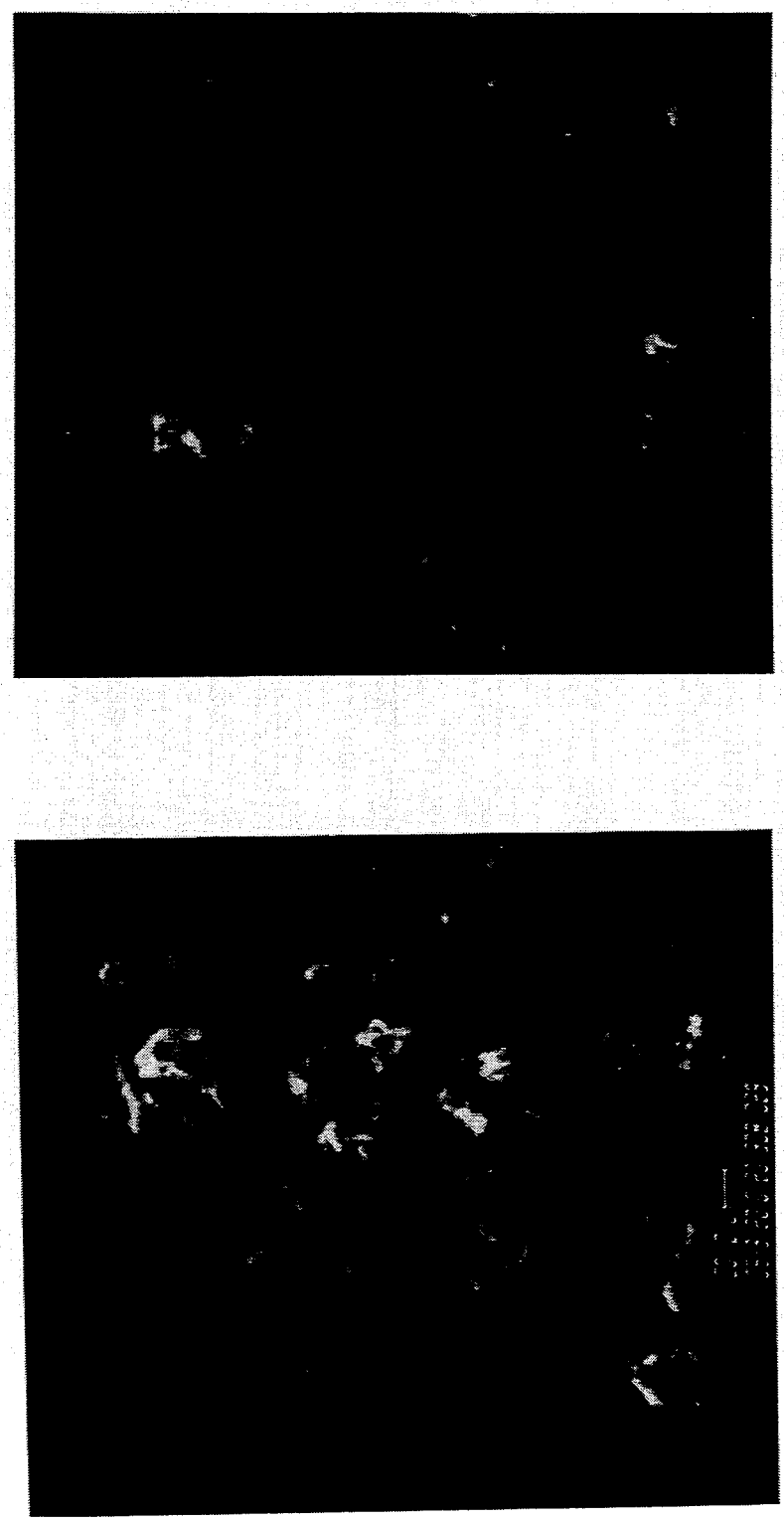
Figure 2B:
Figure 15:
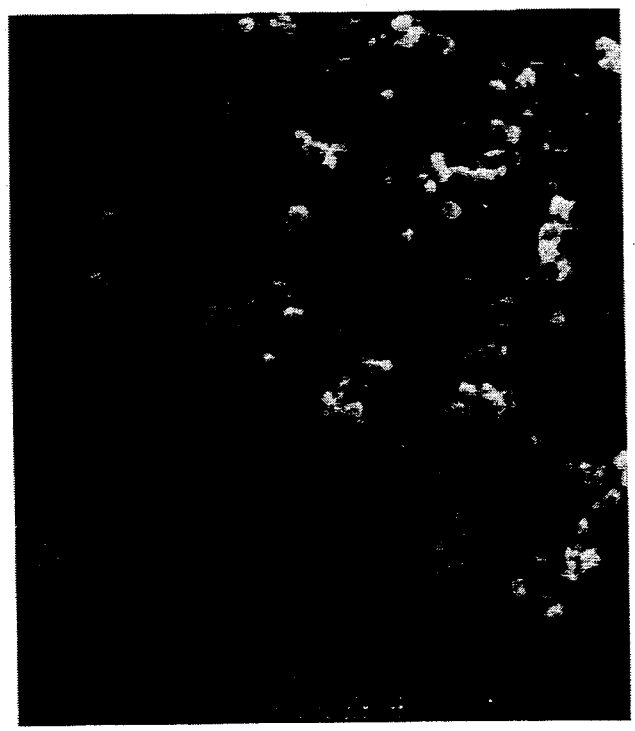
Figure 16:
FIG. 16 is a photomicrograph of a polymer particle formed in accordance with the method of the invention, using Griltex Nylon as the polymer, 1-propanol as the polymer solvent and Isopar G as the non-solvent, said photomicrograph illustrating the surface roughness of the particle.
Figure 17:
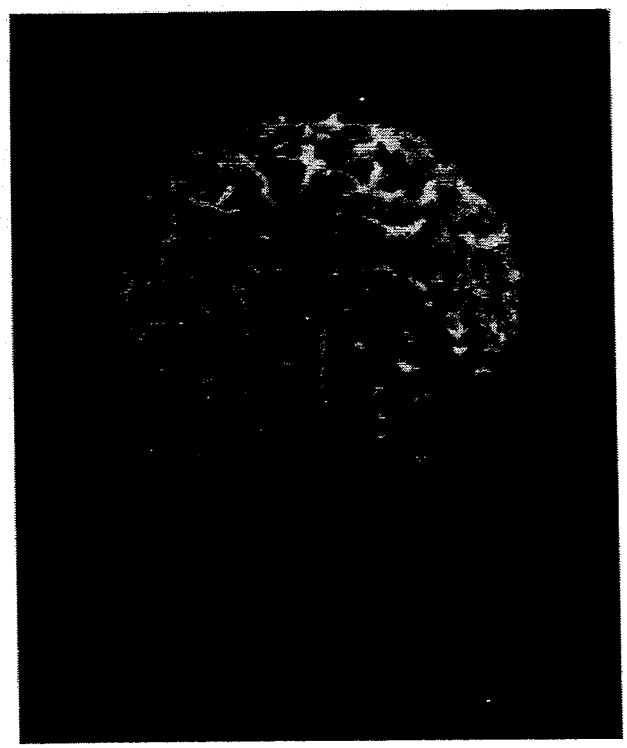
FIG. 17 is a photomicrograph of a polymer particle formed in accordance with the method of the invention, using Griltex Nylon as the polymer, ethanol as the polymer solvent and resulting from the cooling step at a rapid rate (from 70 degress Celsius to −5 degrees Celsius), said photomicrograph illustrating the surface roughness of the particle.
Figure 18A:
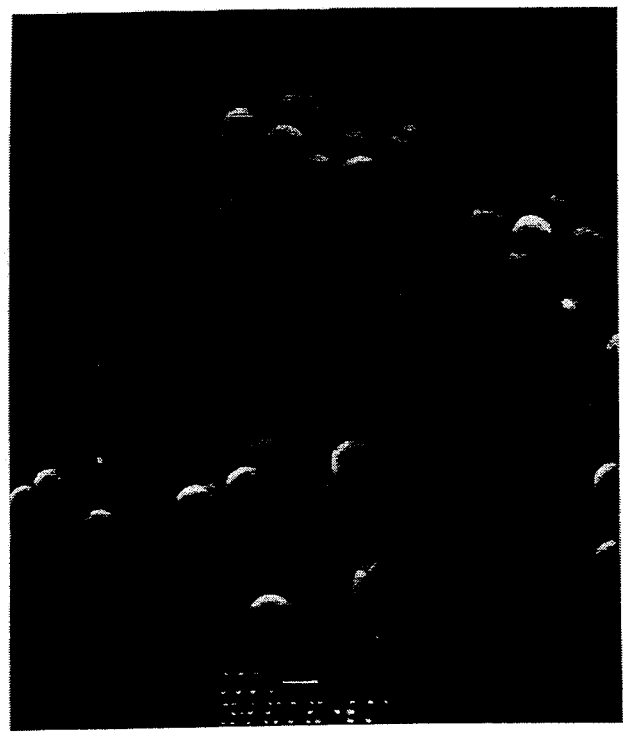
FIGS. 18A, 18B, 18C and 18D are photomicrographs taken using the electron scanning microscope, the photomicrographs showing the polymer particles of Example 7 at different magnifications.
Figure 18B:
Figure 18C:
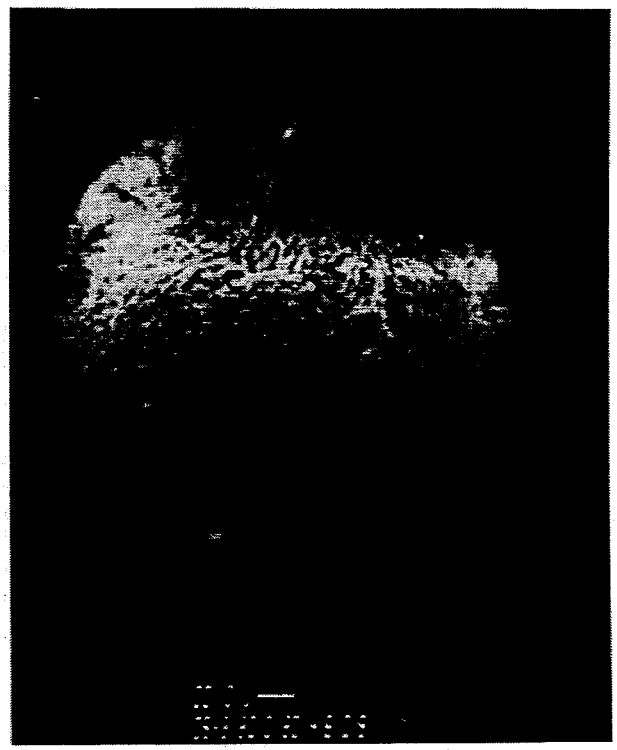
Figure 18D:
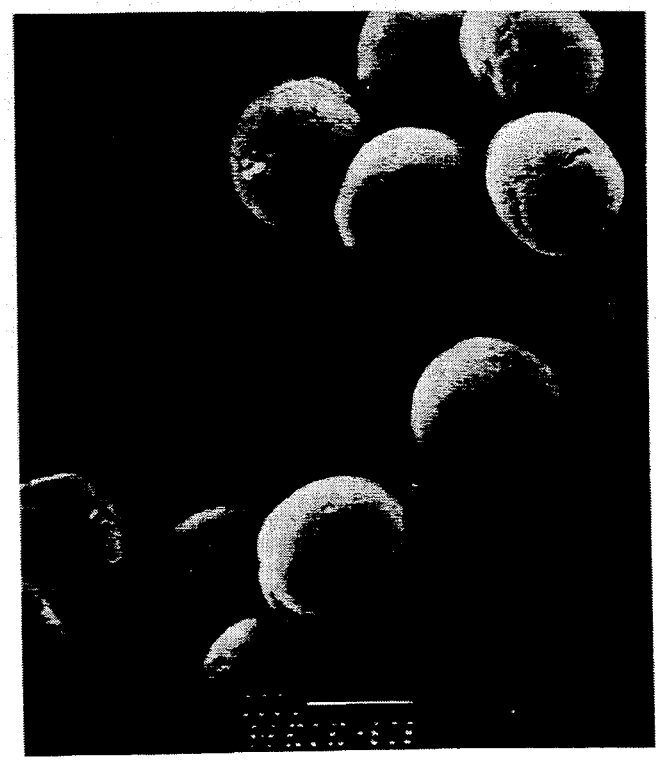
Figure 19A:
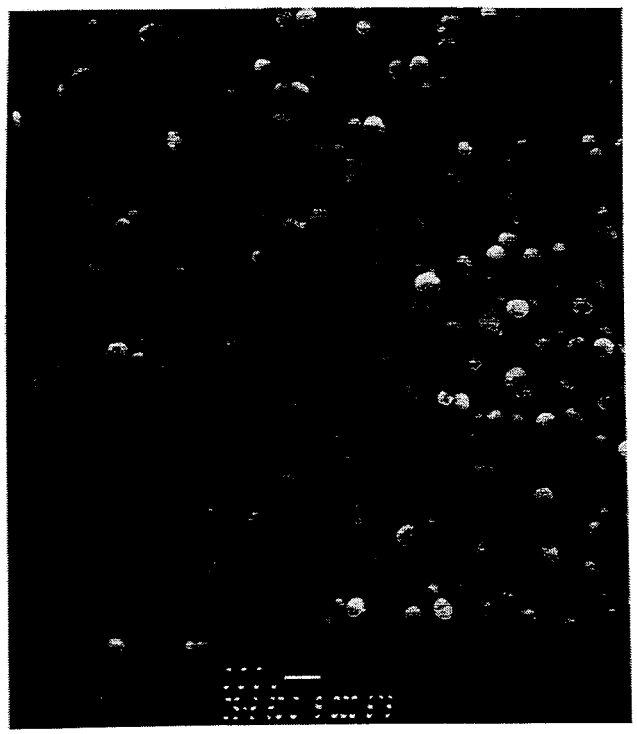
FIGS. 19A and 19B are photomicrographs of the polymer particles of Example 8 at different magnifications.
Figure 19B:
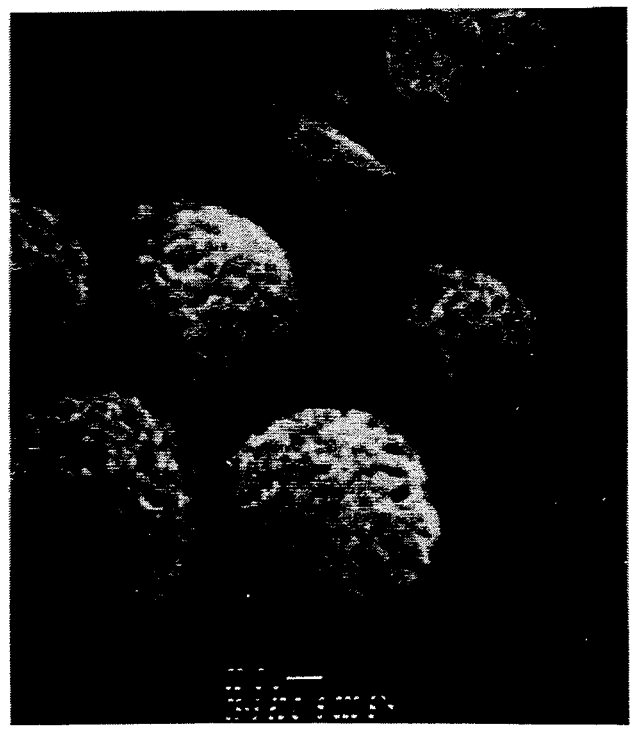
Figure 20A:
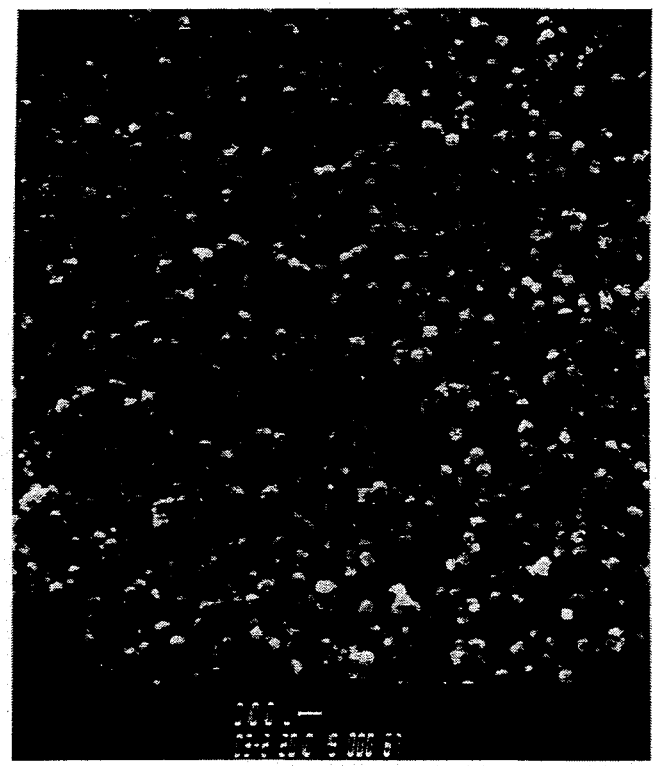
FIGS. 20A and 20B are photomicrographs of the polymer particles of Example 9 at different magnifications.
Figure 20B:
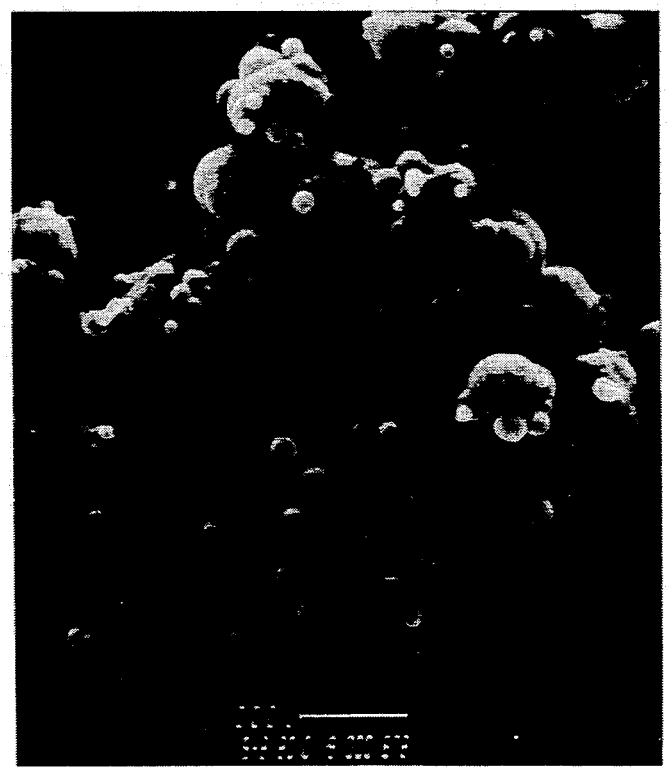

The surface area of the GN/RL precipitated particle has been found to be increased with increasing pigment content while the surface area of the GN/MO precipitated particle appears to remain constant not withstanding the increase in the pigment content. The Monarch 1000 pigment itself has been found to have a relatively large surface area. From such finding one would expect that the precipitated polymer-encapsulated MONARCH-1000 to have a relatively large surface area. However, the precipitated polymer-encapsulated MONARCH-1000 pigment has a surface area much smaller that the precipitated polymer-encapsulated REGAL-L330 having the same amount of REGAL-L330 on the surface. Thus apparently, the precipitated polymer-encapsulated MONARCH-1000 particle has most of the said pigment within the particle while the polymer-encapsulated REGAL L330 particle has most of the pigment embedded in the surface of the particle. This is illustrated in FIGS. 5 and 5A.

REGAL L 330 particle has been found to have a relatively small surface area while precipitated polymer-encapsulated MONARCH 1000 has a surface area larger than particles having the same amount of REGAL L 330 on the surface. Thus apparently, the precipitated polymer-encapsulated MONARCH 1000 particle has most of the said pigment within the particle while the polymer-encapsulated REGAL L 330 particle has most of the pigment embedded in the surface of the particle.

It should be understood that variations may be made by those skilled in the art in the method, components and procedures of the method according to the method of the invention without departing from the spirit and scope thereof as defined in the appended claims.

What is claimed is:

1. A method for making a liquid toner for use in electrophotographic imaging comprising the steps of:
   forming a mixture of a thermoplastic polymer material, a fine particulate pigment and a solvent for said polymer;
   heating the polymer/pigment/solvent mixture to form a solution of the polymer and solvent with the pigment therein;
   cooling the resulting polymer/solvent solution with the pigment therein effecting precipitation of fine polymer-encapsulated pigment particles of generally uniform size and morphology therefrom;
   removing the solvent;
   drying the said precipitated particles; and,
   redispersing the said precipitated particles in a dispersant medium along with the addition of a charge control agent thereto to form said liquid toner.

2. A method for making a liquid toner for use in electrophotographic imaging comprising the steps of
   forming a mixture of a thermoplastic polymer material, a fine particulate pigment and a solvent for said polymer;
   heating the polymer/pigment/solvent mixture for a predetermined duration to form a solution of the polymer and solvent with the pigment present therein;
   adding a non-solvent for said polymer to the thus formed solution effecting precipitation of fine polymer-encapsulated pigment particles of generally uniform size and morphology therefrom;
   isolating the said precipitated polymer-encapsulated pigment particles;
   removing the solvent; and
   redispersing the said polymer-encapsulated pigment particles in a dispersant medium along with a charge control agent to form the liquid toner.

3. The method as claimed in claims 1 or 2 in which the solvent is removed from the said polymer-encapsulated particles by evaporation.

4. The method as claimed in claims 1 or 2 in which a steric stabilizer is introduced into the said polymer-encapsulated pigment dispersion.

5. The method as claimed in claims 1 or 2 in which said polymer solvent is methanol.

6. The method as claimed in claims 1 or 2 in which said polymer solvent is ethanol.

7. The method as claimed in claims 1 or 2 in which said polymer solvent is 1-propanol.

8. The method as claimed in claims 1 or 2 in which the polymer solvent is 2-propanol.

9. The method as claimed in claim 2 in which the non-solvent has a poor thermodynamic quality for the polymer.

10. The method as claimed in claim 2 in which the non-solvent is an aliphatic isoparaffinic electrically insulating hydrocarbon.

11. The method as claimed in claims 1 or 2 in which the polymer is a polyamide.

12. The method as claimed in claims 1 or 2 in which the pigment is carbon-black.

13. The method as claimed in claims 1 or 2 in which the polymer is a polyamide and the pigment is carbon-black.

14. The liquid toner composition formed in accordance with the method of claim 1.

* * * * *